July 29, 1969　　　W. E. PROCTOR, JR　　　3,458,422
LAMINATED GLASS ELECTRODE DIAPHRAGM
Filed Aug. 8, 1966　　　　　　　　　　2 Sheets-Sheet 1

INVENTOR
WILLIAM E. PROCTOR, JR.

July 29, 1969   W. E. PROCTOR, JR   3,458,422
LAMINATED GLASS ELECTRODE DIAPHRAGM
Filed Aug. 8, 1966   2 Sheets-Sheet 2
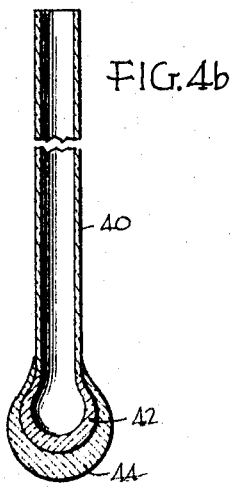
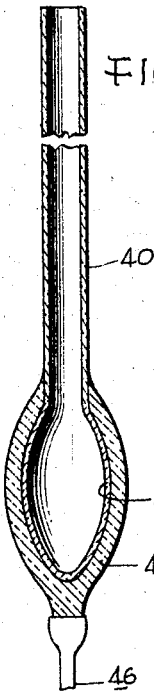
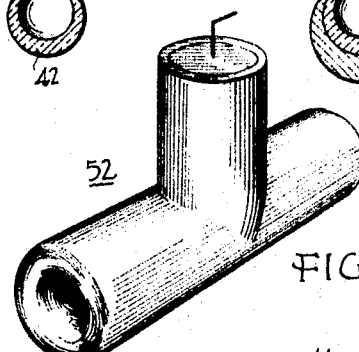
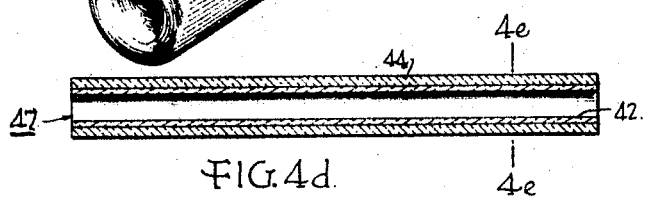
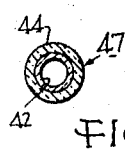
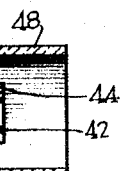
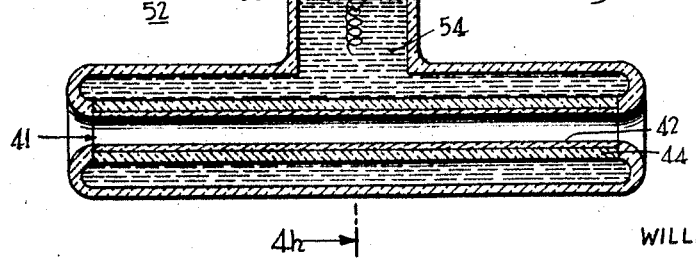
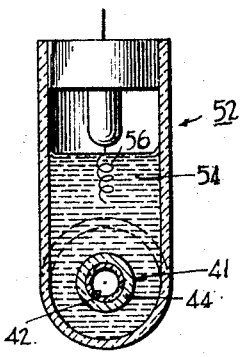
INVENTOR
WILLIAM .E .PROCTOR,JR

United States Patent Office 3,458,422
Patented July 29, 1969

3,458,422
LAMINATED GLASS ELECTRODE DIAPHRAGM
William E. Proctor, Jr., Norristown, Pa., assignor to Leeds & Northrup Company, Philadelphia, Pa., a corporation of Pennsylvania
Filed Aug. 8, 1966, Ser. No. 570,817
Int. Cl. B01k 3/06
U.S. Cl. 204—195                                 9 Claims

ABSTRACT OF THE DISCLOSURE

A glass electrode diaphragm comprising a laminate including at least two glass lamina. The exterior lamina is formed of a substantially Nernstian response pH glass, while the interior lamina is formed of a glass having a specific resistance of less than about $3 \times 10^{10}$ ohm centimeters at 25° C.

---

Figure 1A:
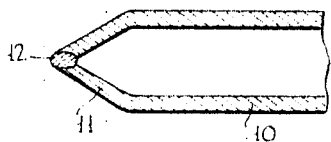

This invention relates to pH electrodes and has for an object the provision of a reliable all purpose pH measuring electrode characterized by good sensitivity throughout a wide range of temperatures and over substantially the entire pH range.

Glass electrodes for measuring the concentration of hydrogen ions in solution generally include a thin-walled diaphragm, or sensitive portion in the form of a bulb or a tube, and a thicker walled shaft or supporting portion fused to the diaphragm. Generally, all pH glasses, along with their desirable pH responsive features, are characterized by numerous less desirable properties, such as high electrical resistance, poor working qualities, or low chemical resistance, i.e., susceptibility to attack by water, acids, or alkalies. To cite an example, lithia glass displays an increase in resistance with time. This increase often results in a pH electrode having a diaphragm which assumes a resistance which is three or more times greater in actual use than it was when originally manufactured.

The deficiencies of the pH glasses have restricted severely the production of a pH measuring electrode which is both durable, that is, has a diaphragm of sufficient thickness and strength to withstand prolonged use, and is also capable of measuring pH values throughout substantially the entire pH range and throughout a wide range of temperatures. To the best of my knowledge, such an all purpose pH measuring electrode heretofore has never been prepared.

In accordance with my invention, there is provided a glass electrode for measuring pH having a pH sensitive diaphragm comprising a laminate including at least two glass laminae, the exterior lamina of said diaphragm formed of a glass comprising from about 20 to about 30 mole percent of $Li_2O$, from about 60 to about 70 mole percent of $SiO_2$, and up to about 20 mole percent of at least one metal oxide, and characterized by a substantially Nernstian response to the hydrogen ion over substantially the entire pH range, and the adjacent lamina formed of a glass having a specific resistance of less than about $3 \times 10^{10}$ ohm centimeters.

The present invention provides a new solution to the problem of producing an all purpose pH measuring electrode and affords a greater latitude of applicability of known pH measuring glasses in the production of such electrodes by permitting the use of a variety of glasses in the construction of pH sensitive diaphragms which heretofore were considered to be impractical. By virtue of my invention, therefore, improved pH electrodes may be provided and the variety of glasses employed in the production of reliable pH electrodes is considerably enlarged.

Although production of multi-layer diaphragms has been suggested for the purpose of improving or modifying the chemical durability of a pH measuring electrode, the fact that glass electrodes possessing laminated diaphragms including two or more laminae composed of certain specific types of glasses have a pH response characteristic of the exterior glass rather than an average of the responses of the two glass layers of which the diaphragm is composed, was entirely unexpected. For instance, British Patent 509,555 discloses a method for improving the chemical durability of a pH measuring electrode by providing a thin layer of chemically resistant glass over a thick layer of conventional soda lime pH measuring glass, or by treating the surface of the soda lime pH glass with a lixivating liquid, such as sulfuric acid, to remove chemically part of the alkali from the surface of the blown glass diaphragm. In view of the disclosure of this patent, it was totally unexpected that the glass electrodes possessing laminated diaphragms prepared in accordance with the present invention would provide a pH response which was characteristic not of the relatively thick base lamina formed of a glass having a specific resistance of less than about $3 \times 10^{10}$ ohm centimeters, but was rather characterized by a response which was substantially equal to the response of an electrode having a diaphragm formed entirely of the lithia glass employed to provide the outer lamina. Since the pH response of a glass depends entirely upon its composition, it was indeed unexpected that comparatively thin film diaphragm laminates having thicknesses of the order of 15 mils or less could be formed of laminae of the required thickness, and of different glass compositions without either a mixing of the two kinds of glasses, an incomplete coverage of the inner lamina by the outer pH responsive lamina, or a contamination of the outer lamina by diffusion of components of the inner lamina of glass.

As noted above, the exterior lamina of the diaphragm of a pH measuring electrode prepared in accordance with the present invention is formed of a glass comprising from about 20 to about 30 mole percent of $Li_2O$, (preferably from 24 to 28 mole percent of $Li_2O$), from about 60 to about 70 mole percent of $SiO_2$ up to about 20 mole percent of at least one metal oxide, and characterized by a substantially Nernstian response to the hydrogen ion over substantially the entire pH range, i.e., exhibits an error of 0.5 pH or less at 12 pH in a 1 N sodium ion solution at 25° C. As used herein, the term, "exterior lamina" is meant to connote the layer of the pH sensitive diaphragm which will be in direct contact with the aqueous solution whose pH is sought to be measured.

Up to 20 percent of the exterior lamina glass may be composed of any metal oxide, provided, however, that the resulting composition exhibit the required substantially Nernstian response to hydrogen ion over substantially the entire pH range. Metal oxides useful in this capacity will readily occur to those skilled in the art and include CaO, BaO, $Cs_2O$, SrO, and $La_2O_3$. Other oxides, such as, for example, $Al_2O_3$, $B_2O_3$, $P_2O_5$, BeO, $TiO_2$, and $SnO_2$, if present in more than trace quantities, will cause large pH errors. Examples of specific glass compositions useful in the production of the exterior lamina of the pH measuring electrodes of the invention are (expressed in mole percent) as follows:

"QA" glass—26% $Li_2O$, 2% $Cs_2O$, 2% CaO, 4% BaO, 2% $MnO_2$, and 64% $SiO_2$. This glass has a coefficient of thermal expansion of $104 \times 10^{-7}$ ° C. and a specific resistance of $5.4 \times 10^{10}$ ohm centimeters at 25° C.

"837" glass—24% $Li_2O$, 8% BaO, 68% $SiO_2$. This glass has a coefficient of expansion of $99 \times 10^{-7}$ ° C. and a specific resistance of $5 \times 10^{10}$ ohm centimeters at 25° C.

The inner glass lamina of the pH diaphragms made in accordance with the invention may, in general, be formed of any glass having a specific resistance of less than about $3 \times 10^{10}$, and preferably less than about $1 \times 10^{10}$ ohm centimeters at 25° C. Specific examples of suitable glass compositions useful in the production of the inner glass lamina (in mole percent) are:

"WS" glass—27% $Li_2O$, 6% BeO, and 67% $SiO_2$. This glass has a coefficient of thermal expansion of $93 \times 10^{-7}$ ° C. and a specific resistance of $2 \times 10^{10}$ ohm centimeters at 25° C.

"853" glass—28.5% $Li_2O$, 4% $TiO_2$, and 67.5% $SiO_2$. This glass has a coefficient of thermal expansion of $96 \times 10^{-7}$ ° C. and a specific resistance of $7 \times 10^8$ ohm centimeters at 25° C.

Other glasses suitable for use in the production of the inner glass lamina will readily occur to those skilled in the art.

The pH sensitive electrodes of the invention may be prepared in accordance with the invention by applying a quantity of a first glass to one end of a diaphragm support in the form of a tube to seal the tube orifice at said end, applying a quantity of a second glass over the first glass to cover the first glass and to contact the tube around its periphery at its end, to form a glass laminate at the tube end, and expanding the glass laminate to form a diaphragm, said first and second glasses being independently selected from the class consisting of (a) a pH sensitive glass useful for the production of the outer lamina of the diaphragm portion of the pH electrode of the invention, as set forth above, and (b) a glass useful in the production of the inner lamina, i.e., a glass having specific resistance of less than about $3 \times 10^{10}$ ohm centimeters at 25° C.

More particularly, the pH sensitive electrodes of the invention may be prepared by forming or mounting the laminated diaphragm upon a supporting means, such as, a glass stem, for example, formed of a material characterized by a high electrical surface and volume resistance and good chemical resistance. Generally, the supporting means should also be characterized by a coefficient of thermal expansion approaching that of both laminae of the diaphragm. Particularly suitable stems may be formed of glasses, such as, for instance, Corning 0010 potash soda lead glass having a thermal coefficient of expansion of $91 \times 10^{-7}$ ° C. and a $\log_{10}$ volume resistance at 350° C. of about 7. Also, Corning 0120 glass may be used having a coefficient of thermal expansion of $89 \times 10^{-7}$ ° C. and a $\log_{10}$ volume resistance at 350° C. of about 8, as well as Kimble KG-1 glass having a coefficient of thermal expansion of $94 \times 10^{-7}$ ° C. and a $\log_{10}$ volume resistance at 350° C. of about 6.8. Other glasses which may be employed to provide the supporting means for the pH sensitive diaphragms in accordance with the invention will readily occur to those skilled in the art.

To illustrate one method for preparing the pH electrodes in accordance with my invention, a small amount or gob of the inner lamina glass is deposited at the end of a necked down portion of the supporting means in the form of a glass tube in a manner such as to seal completely or cover the opening at the tube end to which the gob of glass is applied. Subsequently, the first gob of glass is completely coated with a second layer or gob of the exterior lamina glass. The composite layer is then subjected to a blowing operation to form a diaphragm, or bulb, comprising an outer lamina of the pH sensitive glass and an inner lamina of the base glass, both laminae being joined to the supporting stem or tube. The amount of glass used to form the diaphragm will be such as to provide a diaphragm thickness of about 15 mils or less. Generally, at least half of this thickness, i.e., a major portion of the thickness, will be attributed to the inner, or low resistance glass, and the remaining thickness will be due to the outer or pH measuring lamina. When so prepared, the diaphragm portion of the electrode of the invention will be characterized by a laminate in which the two glass laminae will have a sharp interface at their boundary. As will be appreciated by those skilled in the art, the provision of pH sensitive diaphragms including a plurality of laminae including three or more laminae may also be prepared in accordance with the present invention.

Figure 1B:
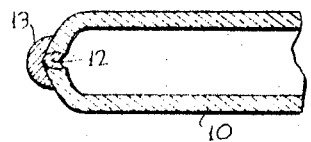
Figure 1C:
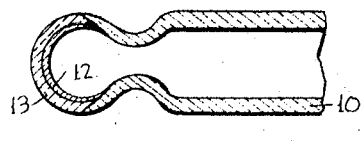
Figure 2A:
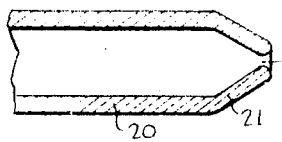
Figure 2B:
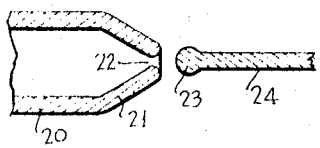
Figure 2C:
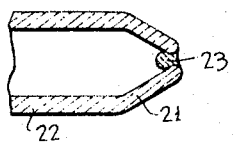
Figure 2D:
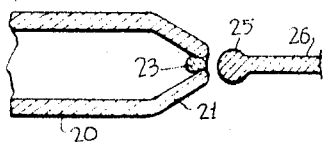
Figure 2E:
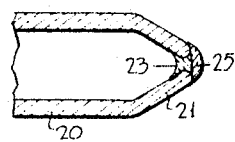
Figure 2F:
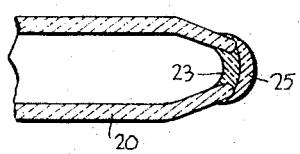
Figure 2G:
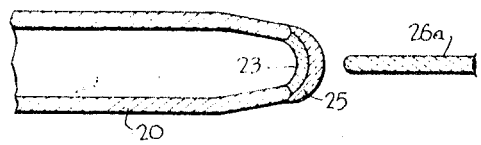
Figure 2H:
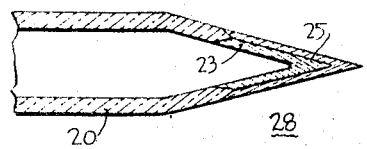
Figure 3A:
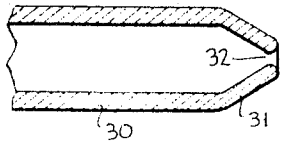
Figure 3B:
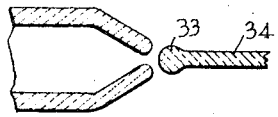
Figure 3C:
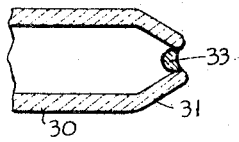
Figure 3D:
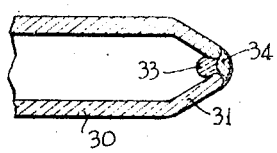
Figure 3E:
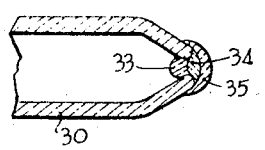
Figure 3F:
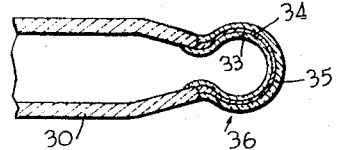

For further objects and advantages of the invention and for a more detailed discussion of preferred embodiments thereof, reference is to be had to the following description taken in conjunction with the accompanying drawing in which:

FIGS. 1–$a$, 1–$b$, and 1–$c$ are cross sectional views of an end portion of a glass tube illustrating various stages in the production of one form of a pH electrode of the present invention;

FIGS. 2–$a$–2–$h$ comprise cross sectional views of an end portion of a glass tube at various stages of production of another form of a pH electrode of the invention;

FIGS. 3–$a$–3$h$ illustrate the various stages in the production of still another type of pH electrode of the invention; and FIGS. 4–$a$–4$g$ illustrate the various stages in the production of yet another type of pH electrode of the invention.

Referring now to FIG. 1-$a$, a 12 mm. tube of Corning 0010 glass 10 was necked down at one end 11 to an orifice of about 4 mm. diameter. A small gob of a type WS glass 12 was placed in the orifice and sucked gently through. As shown in FIG. 1–$b$, a small gob 13 of pH measuring glass was then placed to cover this orifice completely and contact the glass stem 10 around its entire periphery. The tube end was subsequently heated to enlarge the throat and expand the dual glass lens comprising the gob 12 covered by the measuring glass 13. A pH bulb was then blown as shown in FIG. 1–$c$. The resulting pH sensitive diaphragm comprised a laminate which included the two glass laminae 12 and 13 respectively, the exterior of which was formed of a glass having the composition 20–30 mole percent of $Li_2O$, 60–70 percent of $SiO_2$ and up to 20 mole percent of at least one metal oxide and characterized by a substantially Nernstian response to the hydrogen ion over the entire pH range, and the adjacent lamina 12 formed of a glass having a specific resistance of less than about $3 \times 10^{10}$ ohm centimeters at 25° C.

Referring now to FIG. 2–$a$, a 12 mm. tube of Corning 0010 glass 20 was necked down at one end 21 to provide an orifice 22 having a diameter of about 4 mm. A small gob 23 of a base or inner layer glass was then applied to the orifice 22 as shown in FIG. 2–$b$. The base or inner lamina glass was characterized by a specific resistance of less than about $3 \times 10^{10}$ ohm centimeter at 25° C. After the small gob 23 of the base glass was inserted into the orifice 22 the glass rod 24 was detached and the small gob of base glass was gently sucked into the orifice to close completely the orifice as shown in FIG. 2–$c$. Thereafter, as shown in FIG. 2–$d$, a small gob 25 of a pH measuring glass was applied over the base glass 23 filling the orifice of the necked down glass tube 20. After the pH measuring glass 25 was applied to the tip of the orifice, the glass rod 26 was detached and the layer 25 was sealed to the stem of the necked down glass tube 20 around the periphery of the orifice in a manner such that it completely covered the inner layer 23 of base glass as shown in FIG. 2–$e$. The resulting structure was heated slightly and pressure applied within the glass tube 20 to enlarge the diaphragm portion comprising the inner layer 23 covered by the outer layer 25 comprising the pH measuring glass as shown in FIG. 2–$f$. As shown in FIG. 2–$g$, the enlarged diaphragm portion is subsequently contacted with a measuring cane 26–$a$ which is touched to the diaphragm portion comprising the two layers 23 and 25. Contact of the cane 26–$a$ to the diaphragm is conducted under suitable temperatures so as to permit the drawing of the diaphragm into a cone as illustrated in FIG. 2–$h$. The tip of the cone 28 thus comprises the laminate including the two layers 25 and 23 comprising the outer pH measuring glass and the inner base glass. The cone tip 28 is then melted back after the glass cane 26-a detached from the tip.

FIG. 3 illustrates the production of a pH electrode having a diaphragm or pH sensitive portion comprised of a laminate including three laminae. FIG. 3-a shows a Corning 0010 12 mm. tube 30 necked down at one end 31 to provide an orifice 32 having a diameter of about 4 mm. FIG. 3-b illustrates the application of the inner pH measuring glass in the form of a small gob 33 which is applied to the orifice of the stem 30 by means of the glass rod 34. In FIG. 3-c, the small gob 33 has been severed from the glass rod 34 and sucked inside the tube 30. In a similar manner the middle glass portion is applied over the layer 33 as shown in FIG. 3-d. The middle portion 34 comprises a glass having a specific resistance of less than about $3 \times 10^{10}$ ohm centimeters at 25° C.

As shown in FIG. 3-e, an outer pH sensitive layer 35 of glass is applied to cover the inner layers 33 and 34 in a manner such as to completely envelop the middle layer 34 and contact the necked down portion 31 of the glass tube 30. The tube end was then heated to enlarge the diaphragm portion, and the bulb 36 was blown as illustrated in FIG. 3-f. Bulb 36, which constitutes the diaphragm or pH sensitive portion of the electrode, thus comprises a laminate composed of three layers of glass, the external layer 35 comprising a pH sensitive glass and the inner layer 34 comprising a glass having a specific resistance of less than about $3 \times 10^{10}$ ohm centimeters at 25° C. Interior layer 33 comprises a glass which may be the same as layer 35, or alternatively, may have a different composition within the range specified above.

FIG. 4 illustrates the production of a capillary type pH electrode useful for the continuous measurement of pH of solutions, and finds particular applicability for pH measurement of relatively small volumes of sample solutions.

As shown in FIG. 4-a, a blow pipe or supporting means 40 has been dipped into a molten pH sensitive glass having a composition of, in mole percent, from about 20 to about 30 percent $Li_2O$, from about 60 to about 70 percent $SiO_2$, and up to about 20 percent of at least one metal oxide, and characterized by a substantially Nerstian response to the hydrogen ion over substantially the entire pH range. This glass gob 42, intended for the production of the inner layer of the capillary tube, is subsequently dipped into a second crucible containing molten glass which is intended to surround the first layer and which is characterized by a specific resistance of less than about $3 \times 10^{10}$ ohm centimeters at 25° C.

As shown in FIG. 4-b, the second layer 44 of glass envelops the first layer 42 and is secured to the blow pipe around the periphery of the orifice in a manner such that it completely covers the inner layer 42. The composite bulb thus formed is blown out slightly and elongated.

As shown in FIG. 4-c, a punty 46 is attached at the far end of the bulb and the composite bulb is quickly drawn out into a tube. The resultant tube 47 formed is shown in FIG. 4-d and comprises an outer lamina 44 of the glass characterized by a specific resistance of less than about $3 \times 10^{10}$ ohm centimeters at 25° C. and an inner lamina 42 of the pH sensitive glass having a composition falling into the aforesaid range. An end view along the dotted line 4—4 of the glass tube 47 thus formed having the two laminae 44 and 42 is shown in FIG. 4-e.

The resultant section or tube 47 is shown in FIG. 4-f to be mounted in tube 48 as of Corning 001 glass or equivalent. The ends of the tube 47 are then sealed to the ends of the tube 48, and the latter joined to a vertical tube 50, to provide a T-shaped capillary pH electrode 52, as shown in FIG. 4-g. The annular space 54 may then be filled with a suitable buffer solution which is contacted by a reference electrode 56. An end view of the electrode 52 in the direction of the arrows is shown in FIG. 4-f, and an isometric view is shown in FIG. 4-i.

By the foregoing method, three pH electrodes were made with diaphragm portions in the form of bulbs comprising a laminate including an outer lamina of pH sensitive glass over an inner lamina of glass having a specific resistance of less than about $3 \times 10^{10}$ ohm centimeters at 25° C. The three electrodes were designated L-1, L-2, and L-3 respectively, and were left standing in water overnight, and were subsequently used to measure known pH solutions. The voltages obtained are shown compared to voltage readings obtained by measuring the identical pH solution with an electrode whose entire diaphragm was composed of the outer pH sensitive glass, and an electrode whose entire diaphragm was composed of the inner layer glass. The results were compared to the voltages obtained by measuring the identical pH solutions with a hydrogen gas electrode and a saturated calomel electrode at 25° C.

TABLE I.—EMF VOLTS VS. SATURATED CALOMEL ELECTRODE AT 25° C.

| Glass types | 841 | 841 | 841 | 841 | WS | $H_2$ Gas |
|---|---|---|---|---|---|---|
| Do | WS | WS | WS | | | |
| Designation | L-1 | L-2 | L-3 | S-1 | S-1 | |
| 6.86 pH Buffer | −0.12870 | −0.12100 | −0.13310 | −0.01045 | +0.02530 | +0.65000 |
| 13.5 pH 2N Na' | +0.25010 | +0.25620 | +0.24500 | +0.36000 | +0.21200 | +1.03905 |
| ΔE | (0.37880) | (0.37720) | (0.37810) | (0.37045) | (0.19670) | (0.38905) |
| "Na" Error | (0.01025) | (0.01185) | (0.01095) | (0.01860) | (0.19235) | |

The data in Table I shows that the EMF difference measured in the two solutions by the laminated electrodes of the invention averaged 378 millivolts while an electrode having a diaphragm portion composed entirely of the pH measuring glass alone gave an EMF difference of 370 millivolts. This discrepancy in the favor of the laminates is due to the lack of conditioning (slight water leaching needed to obtain response) of the pH sensitive glass bulb which was newly blown just prior to the measurement. The L-1, L-2, and L-3 electrodes on the other hand had been left standing in water overnight before the pH tests were run. The glass electrodes having diaphragms composed of the inner layer of glass used to provide the laminates, however, yielded a difference of 197 millivolts. Since the hydrogen gas electrode difference in this solution was 389 millivolts, the laminates had an error of about 0.2 pH units (each 59 millivolt difference corresponds to an error of one unit of pH), the single pH 841 glass bulb had an error of about 0.3 pH unit, while the WS glass bulb had an error of 3.2 pH.

The advantages afforded by the pH electrodes prepared in accordance with the invention are further illustrated in Tables II and III below. Table II sets forth data obtained from tests of three pH measuring electrodes of the invention in which the diaphragm portions of the electrodes were composed of two laminae, the outer lamina formed of a pH sensitive QA glass having the composition (in mole percent) 26% $Li_2O$, 2% $Cs_2O$, 2% $CaO$, 2% $MnO_2$, 4% $BaO$, and 64% $SiO_2$. The inner or base lamina was composed of a (WS) glass having the composition (in mole percent) 27% $Li_2O$, 6% $BeO$, and 67% $SiO_2$. The EMF response of the three electrodes of the invention, designated as samples 1, 2, and 3, were compared with the pH response of an electrode in which the diaphragm portion was formed entirely of QA glass, designated as sample 4, and the pH response of two electrodes, designated samples 5 and 6, whose diaphragm portions were formed entirely of WS glass. All EMF values obtained were compared with the EMF response of a hydrogen gas electrode.

TABLE II

| Conditions | Laminate: QA measuring glass WS base glass | | QA measuring glass electrode | | WS base glass electrode | | Hydrogen gas electrode |
|---|---|---|---|---|---|---|---|
| | 1 | 2 | 3 | 4 | 5 | 6 | |
| 4 pH to 6.86 pH | 0.168 | 0.169 | 0.166 | 0.168 | 0.143 | 0.143 | 0.169 |
| 6.86 pH to 13.17 pH with 2N Na+ conc | 0.347 | 0.346 | 0.346 | 0.346 | 0.189 | 0.189 | 0.374 |
| Sodium ion (V) | 0.027 | 0.028 | 0.028 | 0.028 | 0.185 | 0.185 | |
| Error (pH) | 0.45 | 0.47 | 0.47 | 0.47 | 3.13 | 3.13 | |

Table III illustrates the comparative data obtained by testing two pH electrodes prepared in accordance with the invention in which the diaphragm portions were composed of two laminae, the outer pH sensitive lamina being formed of an 837 glass having the composition, in mole percent, 24% $Li_2O$, 8% BaO, and 68% $SiO_2$, and the inner or base lamina being composed of 853 glass having the composition, in mole percent, 28.5% $Li_2O$, 4% $TiO_2$, and 67.5% $SiO_2$. The EMF responses of the electrodes of the invention designated as Samples 1 and 2, were compared with the EMF responses of electrodes having diaphragms composed entirely of 837 glass, designated as samples 3 and 4, as well as electrodes having diaphragms composed entirely of 853 glass, designated as samples 5 and 6. The results were compared to the EMF response of a hydrogen gas electrode.

TABLE III

| Conditions | Laminate #837 measuring #853 base | | #837 measuring glass electrode | | #853 Base glass electrode | | Hydrogen gas electrode |
|---|---|---|---|---|---|---|---|
| | 1 | 2 | 3 | 4 | 5 | 6 | |
| 4 pH to 6.86 pH | 0.166 | 0.164 | 0.166 | 0.166 | 0.143 | 0.142 | 0.169 |
| 6.86 pH to 13.17 pH with 2N Na+ conc | 0.343 | 0.342 | 0.342 | 0.342 | 0.261 | 0.261 | 0.374 |
| Sodium ion (V) | 0.031 | 0.032 | 0.032 | 0.032 | 0.113 | 0.113 | |
| Error (pH) | 0.52 | 0.54 | 0.54 | 0.54 | 1.91 | 1.91 | |

The foregoing data establish that the laminated pH electrode bulbs of the invention have properties which are equal to those of the exterior measuring lamina alone and that they have not been degraded by the bonding and forming operations that were employed during their manufacture. This result is totally unobvious since the use of a relatively poor pH responsive "base" lamina composed of the WS glass would be expected to provide a glass diaphragm in which the pH response of the bulb would be characterized by the pH response of the base lamina in cases where the base was substantially thicker than the outer lamina, or by a pH response which would be intermediate of the two glasses forming the laminate. This is particularly true, since at the high temperature at which the glasses are soft enough to permit the formation of the bulb, a certain amount of diffusion of the constituent of one glass into the other glass would result. Such diffusion would reduce the pH responsiveness of the outer lithia lamina to a value more representative of the base lamina. The pH electrode diaphragms of the invention, however, were found to exhibit a sharp, clearly defined interface boundary between the laminae composed of the lithia glass and the inner lamina composed of the low resistance glass.

Physical strength is obviously greatly enhanced when laminated electrode bulbs are used, for instance, when the outer measuring layer has a high specific resistance and the inner glass supporting film has a much lower resistance. This permits the composite laminate to attain thicker sections than the single measuring film with the same electrical resistance.

A significant advantage of the present invention is that improved measuring glasses may be employed whose other properties, as for instance, their electrical or mechanical properties, might not permit their use in electrode structures such as conventionally employed at the present time. An additional advantage of the invention resides in that the resistance of the electrode diaphragm may be considerably reduced. This lowered electrical resistance results in the fact that the electrodes prepared in accordance with the invention are less susceptible to "pick up" and leakage currents over insulation. This means that such electrodes yield more stable and accurate measurements.

Still a further advantage of the invention is the attainment of a better match of the coefficient of thermal expansion between the measuring bulb and its supporting stem structure. Corning 0010 stem glass, for instance, has a thermal coefficient of expansion of $91 \times 10^{-7}$ ° C. between 0–300° C. Present practical measuring glasses usually are characterized by thermal coefficients of expansion of from between 105 to $120 \times 10^{-7}$ ° C. Commercial practice calls for a differential of 10 units or less for strong seals.

By permitting the use of thinner sections of measuring glass without loss of physical strength, the present invention also permits glasses of higher specific resistance to be utilized. Glasses of this type generally contain lesser amounts of the conducting alkali ion. Since this component is a major contributor to the coefficient of expansion, these glasses would more closely approach the coefficient of the stem glass than is currently the case in the manufacture of pH measuring electrodes. This results in structures which are more strain free. It is noted in this connection that "spontaneous" development of cracks at the glass seal is presently a major cause of electrode failure. By virtue of the present invention, such spontaneous development of cracks may be considerably reduced.

The composition changes described in the foregoing paragraph lead to improved durability to chemical attack such as leaching of the surface in hot water. It is this leaching which causes electrodes to become sluggish in response and shortens their useful life. Similar compositional changes permit pH measuring electrodes to reach higher pH measuring levels with less interference from other monovalent cations, such as sodium, etc. This relative freedom from sodium ion error is one of the most desirable properties of the pH measuring electrodes prepared in accordance with the present invention.

From the foregoing discussion, it should be realized that the glass electrodes of the present invention may be described as all purpose glass measuring electrodes which are operative at high and low temperatures and over substantially the entire range of pH values. At the same time, the electrodes of the present invention possess excellent mechanical strength.

I claim:
1. A pH measuring electrode having a pH sensitive diaphragm comprising a laminate including at least two non-porous glass laminae;
   the exterior lamina of said diaphragm formed of a glass comprising, in mole percent, from about 20 to about 30 percent $Li_2O$, from about 60 to about 70 percent $SiO_2$, and up to about 20 percent of at least one metal oxide, and characterized by a substantially Nernstian response to the hydrogen ion over substantially the entire pH range; and
   the adjacent lamina fromed of a glass having a specific resistance of less than about $3 \times 10^{10}$ ohm centimeters at 25° C. and characterized by a poorer pH response than said exterior lamina.
2. The electrode of claim 1 in which said laminate is characterized by a sharp interface at the boundary between said laminae.
3. The electrode of claim 1 in which said diaphragm has a thickness of not more than about 15 mils.
4. The electrode of claim 1 including
   supporting means characterized by a thermal coefficient of expansion substantially matching the thermal coefficient of expansion of the glass forming the exterior lamina of the diaphragm.
5. The electrode of claim 1 in which said metal oxide is selected from the class consisting of CaO, BaO, $Cs_2O$, SrO, and $La_2O_3$.
6. The electrode of claim 1 in which the $Li_2O$ content of the exterior lamina of said diaphragm ranges from about 24 to about 28 percent.
7. The electrode of claim 1 in which the adjacent lamina is formed of a glass having a specific resistance of less than about $1 \times 10^{10}$ ohm centimeters at 25° C.
8. The electrode of claim 1 in which the diaphragm comprises a laminate including three non-porous glass laminae;
   the two exterior laminae being formed of glasses comprising, in mole percent, from about 20 to about 30 percent $Li_2O$, from about 60 to about 70 percent $SiO_2$, and up to about 20 percent of at least one metal oxide, and characterized by a substantially Nernstian response to the hydrogen ion over substantially the entire pH range; and
   the interior lamina, disposed between the two exterior laminae, formed of a glass having a specific resistance of less than about $3 \times 10^{10}$ ohm centimeters at 25° C. and characterized by a poorer pH response than said exterior laminae.
9. The electrode of claim 1 in which said diaphragm is in the form of a tube adapted for the continuous measurement of pH solutions.

References Cited

UNITED STATES PATENTS

| | | | |
|---|---|---|---|
| 2,444,845 | 7/1948 | Perley | 204—195.1 |

FOREIGN PATENTS

| | | |
|---|---|---|
| 495,303 | 11/1938 | Great Britain. |
| 509,555 | 7/1939 | Great Britain. |

OTHER REFERENCES

Ives et al., "Reference Electrodes," 1961, pp. 260 and 261.

JOHN H. MACK, Primary Examiner

T. TUNG, Assistant Examiner

U.S. Cl. X.R.

65—36, 46; 161—193